(12) United States Patent
Ghatti et al.

(10) Patent No.: US 11,608,877 B2
(45) Date of Patent: Mar. 21, 2023

(54) AXLE ASSEMBLY HAVING A SECTOR CAM

(71) Applicant: ArvinMeritor Technology, LLC, Troy, MI (US)

(72) Inventors: Chetankumar Ghatti, Troy, MI (US); Ajitkumar Radder, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/181,641

(22) Filed: Feb. 22, 2021

(65) Prior Publication Data

US 2022/0268340 A1 Aug. 25, 2022

(51) Int. Cl.
*F16H 3/089* (2006.01)
*B60K 17/08* (2006.01)
*F16H 37/04* (2006.01)

(52) U.S. Cl.
CPC ............ *F16H 3/089* (2013.01); *B60K 17/08* (2013.01); *F16H 37/042* (2013.01); *F16H 2200/0039* (2013.01); *F16H 2702/04* (2013.01)

(58) Field of Classification Search
CPC ........ F16H 3/089; F16H 37/042; B60K 17/08
USPC ...................................................... 74/337.5
See application file for complete search history.

(56) References Cited

U.S. PATENT DOCUMENTS

| | | | |
|---|---|---|---|
| 1,981,236 A | 11/1934 | Logue | |
| 2,338,154 A | 1/1944 | Wilkinson | |
| 4,304,152 A | 12/1981 | Michling | |
| 4,531,423 A * | 7/1985 | Fogelberg | F16H 63/18 74/473.26 |
| 4,770,280 A * | 9/1988 | Frost | F16D 23/12 74/473.1 |
| 5,603,671 A | 2/1997 | Schmidt | |
| 5,713,243 A * | 2/1998 | Williams | F16H 63/3016 74/569 |
| 6,176,146 B1 | 1/2001 | Ore | |
| 6,216,560 B1 | 4/2001 | Takada et al. | |
| 6,974,400 B2 * | 12/2005 | Williams | B60K 17/3462 475/198 |
| 7,004,875 B2 * | 2/2006 | Williams | B60K 23/08 475/198 |
| 7,530,912 B2 | 5/2009 | Kramer | |
| 7,798,937 B2 | 9/2010 | Gitt | |
| 8,858,379 B2 | 10/2014 | Keeney et al. | |
| 10,900,564 B2 | 1/2021 | Sinka et al. | |

(Continued)

FOREIGN PATENT DOCUMENTS

| | | |
|---|---|---|
| DE | 2005047 A1 | 8/1971 |
| DE | 3036465 A1 | 5/1982 |

(Continued)

OTHER PUBLICATIONS

Dhanapal Vittala Raya, et al., U.S. Appl. No. 16/205,586, filed with the United States Patent and Trademark Office on Nov. 30, 2018.

(Continued)

*Primary Examiner* — Ha Dinh Ho
(74) *Attorney, Agent, or Firm* — Brooks Kushman PC

(57) ABSTRACT

An axle assembly that includes a sector cam. The sector cam may be rotatable about a sector cam axis and may be operatively connected to first and second shift collars. Rotation of the sector cam about the sector cam axis may control movement of the first and second shift collars.

20 Claims, 11 Drawing Sheets

(56) References Cited

U.S. PATENT DOCUMENTS

| | | |
|---|---|---|
| 2003/0125150 A1 | 7/2003 | Tanzer |
| 2005/0124450 A1 | 6/2005 | Gady et al. |
| 2005/0176543 A1 | 8/2005 | Kirkwood et al. |
| 2005/0187058 A1 | 8/2005 | Teraoka |
| 2006/0094552 A1 | 5/2006 | Duncan |
| 2007/0275816 A1 | 11/2007 | Henderson |
| 2008/0146396 A1 | 6/2008 | Millar |
| 2010/0000807 A1 | 1/2010 | Rodriguez et al. |
| 2011/0111910 A1 | 5/2011 | Ideshio et al. |
| 2012/0238387 A1 | 9/2012 | Stuart |
| 2013/0005526 A1 | 1/2013 | Matsubara et al. |
| 2013/0017927 A1 | 1/2013 | Morscheck et al. |
| 2013/0296094 A1 | 11/2013 | Mack et al. |
| 2014/0087906 A1 | 3/2014 | Keeney et al. |
| 2014/0262675 A1 | 9/2014 | Sugiyama et al. |
| 2014/0274529 A1 | 9/2014 | Edler et al. |
| 2014/0311266 A1 | 10/2014 | Nakashima et al. |
| 2015/0059508 A1* | 3/2015 | Ekonen .......... F16H 63/08 74/473.1 |
| 2015/0151634 A1 | 6/2015 | Smetana |
| 2015/0330492 A1 | 11/2015 | Lee et al. |
| 2016/0053880 A1 | 2/2016 | Peura |
| 2017/0057349 A1 | 3/2017 | Ogawa et al. |
| 2017/0059007 A1 | 3/2017 | Eo et al. |
| 2018/0015816 A1 | 1/2018 | Robinette et al. |
| 2018/0112770 A1 | 4/2018 | Hansson et al. |
| 2019/0054816 A1 | 2/2019 | Garcia et al. |
| 2019/0054817 A1 | 2/2019 | Garcia et al. |
| 2019/0054818 A1 | 2/2019 | Garcia et al. |
| 2020/0096084 A1 | 3/2020 | Engerman |

FOREIGN PATENT DOCUMENTS

| | | |
|---|---|---|
| DE | 4120262 A1 | 5/1992 |
| DE | 19827756 A1 | 12/1999 |
| DE | 19915926 A1 | 3/2000 |
| DE | 19952625 A1 | 6/2001 |
| DE | 10049197 A1 | 4/2002 |
| DE | 10226572 A1 | 1/2004 |
| DE | 102004038882 A1 | 3/2005 |
| DE | 102010061217 A1 | 6/2012 |
| DE | 102011007253 A1 | 10/2012 |
| DE | 102011007257 A1 | 10/2012 |
| DE | 102011007268 A1 | 10/2012 |
| EP | 0677414 A2 | 10/1995 |
| EP | 1512884 A2 | 3/2005 |
| EP | 2444265 A1 | 4/2012 |
| EP | 2752325 A1 | 7/2014 |
| GB | 723073 A | 2/1955 |
| JP | S57059124 U | 4/1982 |
| JP | H04185207 A | 7/1992 |
| JP | 2003019911 A | 1/2003 |
| WO | 2013029682 A1 | 3/2013 |
| WO | 2016132800 A1 | 8/2016 |
| WO | 2017114423 A1 | 7/2017 |

OTHER PUBLICATIONS

Mark Smith, et al., U.S. Appl. No. 16/205,623, filed with the United States Patent and Trademark Office on Nov. 30, 2018.
Mark Smith, et al., U.S. Appl. No. 16/206,182, filed with the United States Patent and Trademark Office on Nov. 30, 2018.
Rodrigo Soffner, et al., U.S. Appl. No. 16/205,663, filed with the United States Patent and Trademark Office on Nov. 30, 2018.
Angel Begov, et al., U.S. Appl. No. 16/205,717, filed with the United States Patent and Trademark Office on Nov. 30, 2018.
Mark Smith, et al., U.S. Appl. No. 16/205,771, filed with the United States Patent and Trademark Office on Nov. 30, 2018.
Tao Peng, et al., U.S. Appl. No. 16/205,850, filed with the United States Patent and Trademark Office on Nov. 30, 2018.
Chetankumar Ghatti, et al., U.S. Appl. No. 16/594,362, filed with the United States Patent and Trademark Office on Oct. 7, 2019.
Chetankumar Ghatti, et al., U.S. Appl. No. 16/594,702, filed with the United States Patent and Trademark Office on Oct. 7, 2019.
Chetankumar Ghatti, et al., U.S. Appl. No. 16/594,932, filed with the United States Patent and Trademark Office on Oct. 7, 2019.
Extended European Search Report dated Jul. 22, 2022 for related European Appln. No. 22157703.4 18 Pages.
India First Examination Report dated Sep. 1, 2022 for India Application No. 202214004812; 5 pages.

\* cited by examiner

AXLE ASSEMBLY HAVING A SECTOR CAM

TECHNICAL FIELD

This relates to an axle assembly that has a sector cam that controls movement of at least one shift collar.

BACKGROUND

A drivetrain assembly having a shift mechanism that includes a sector cam is disclosed in U.S. Pat. No. 10,900,564.

SUMMARY

In at least one embodiment an axle assembly is provided. The axle assembly may include a first shaft, a second shaft, a first set of gears, a second set of gears, a first shift collar, a second shift collar, and a sector cam. The first shaft may be rotatable about a first axis. The second shaft may be rotatable about a second axis. The first set of gears may be rotatable about the first axis. The second set of gears may be rotatable about the second axis. Each member of the second set of gears may mesh with a different member of the first set of gears. The first shift collar may be rotatable about the first axis with the first shaft and may be moveable along the first axis with respect to the first shaft to selectively connect a member of the first set of gears to the first shaft. The second shift collar may be rotatable about the second axis with the second shaft and may be moveable along the second axis with respect to the second shaft to selectively connect a member of the second set of gears to the second shaft. The sector cam may be rotatable about a sector cam axis and may be operatively connected to the first shift collar and to the second shift collar. Rotation of the sector cam about the sector cam axis may control movement of the first shift collar along the first axis and may control movement of the second shift collar along the second axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
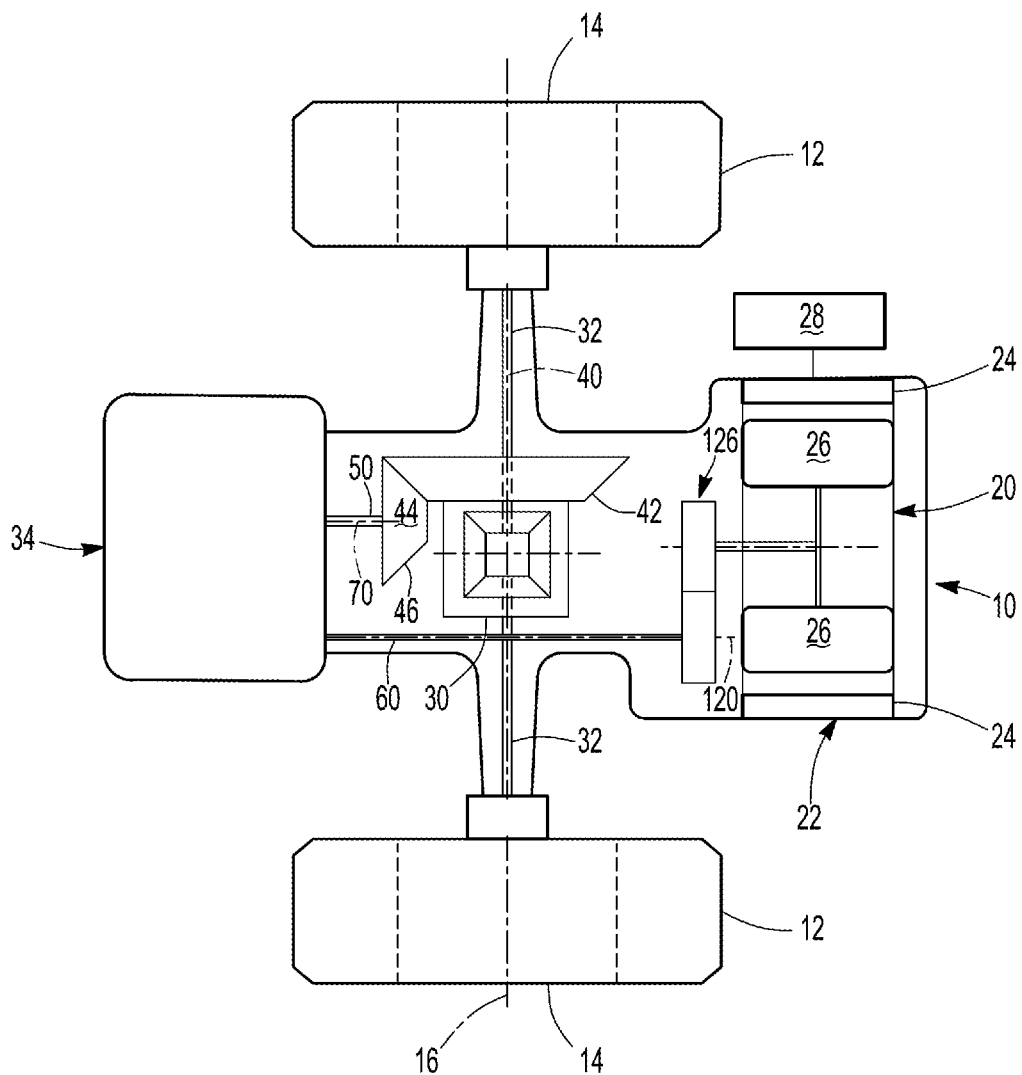
FIG. 1 is a schematic representation of an example of an axle assembly.

Referring to FIG. 1, an example of an axle assembly 10 is shown. The axle assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The axle assembly 10 may provide torque to one or more traction wheel assemblies that may include a tire 12 mounted on a wheel 14. The wheel 14 may be mounted to a wheel hub that may be rotatable about a wheel axis 16.

The axle assembly 10 may include or may be operatively connected to a torque source 20. The torque source 20 may be of any suitable type. For instance, the torque source 20 may be a non-electrical torque source, an electrical torque source, or combinations thereof. An example of a non-electrical torque source is an internal combustion engine. An example of an electrical torque source is an electric motor 22. An electric motor 22 may include a stator 24 and a rotor 26 that may be rotatable about an axis. An electrical power source 28 such as a battery, capacitor, generator, or the like, may be electrically connected to an electric motor 22 in a manner known by those skilled in the art.

Figure 2:
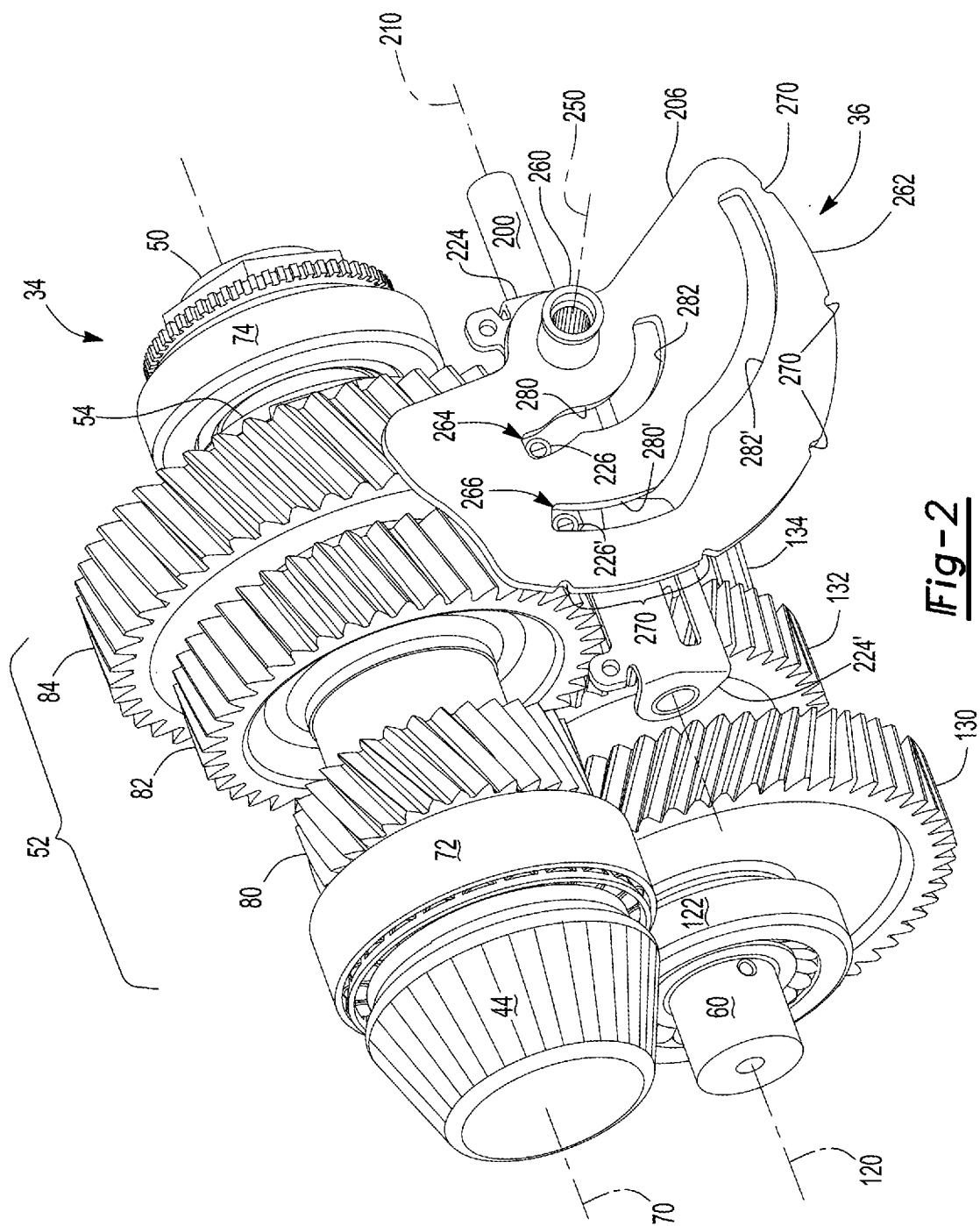
FIG. 2 is a perspective view of an example of a transmission and a shift mechanism that may be provided with the axle assembly.

In at least one configuration, the axle assembly 10 may include a differential assembly 30, at least one axle shaft 32, and a transmission 34. The axle assembly 10 may also include a shift mechanism 36 as shown in FIG. 2.

Referring to FIG. 1, the differential assembly 30 may transmit torque to the vehicle traction wheel assemblies and permit the traction wheel assemblies to rotate at different velocities. In addition, the differential assembly 30 may be operatively connected to the axle shafts 32 and may permit the axle shafts 32 to rotate at different rotational speeds in a manner known by those skilled in the art. For instance, the differential assembly 30 may be rotatable about a differential axis 40 and may transmit torque to the axle shafts 32 and wheels. The differential axis 40 may be coaxially disposed with the wheel axis 16 in one or more configurations. In at least one configuration, the differential assembly 30 may have a ring gear 42 that may have teeth that mate or mesh with the teeth of a gear portion 44 of a drive pinion 46 that may be associated with the transmission 34. Accordingly, the differential assembly 30 may receive torque from the drive pinion 46 via the ring gear 42 and transmit torque to the axle shafts 32.

The axle shafts 32 may transmit torque between the differential assembly 30 and the traction wheel assemblies. Two axle shafts 32 may be provided that may extend in opposite directions from the differential assembly 30. Each axle shaft 32 may have a first end and a second end. The first end may be operatively connected to the differential assembly 30. The second end may be disposed opposite the first end and may be operatively connected to a wheel. The axle shafts 32 or a portion thereof may extend along and may be rotatable about an axis, such as the differential axis 40.

Figure 3:
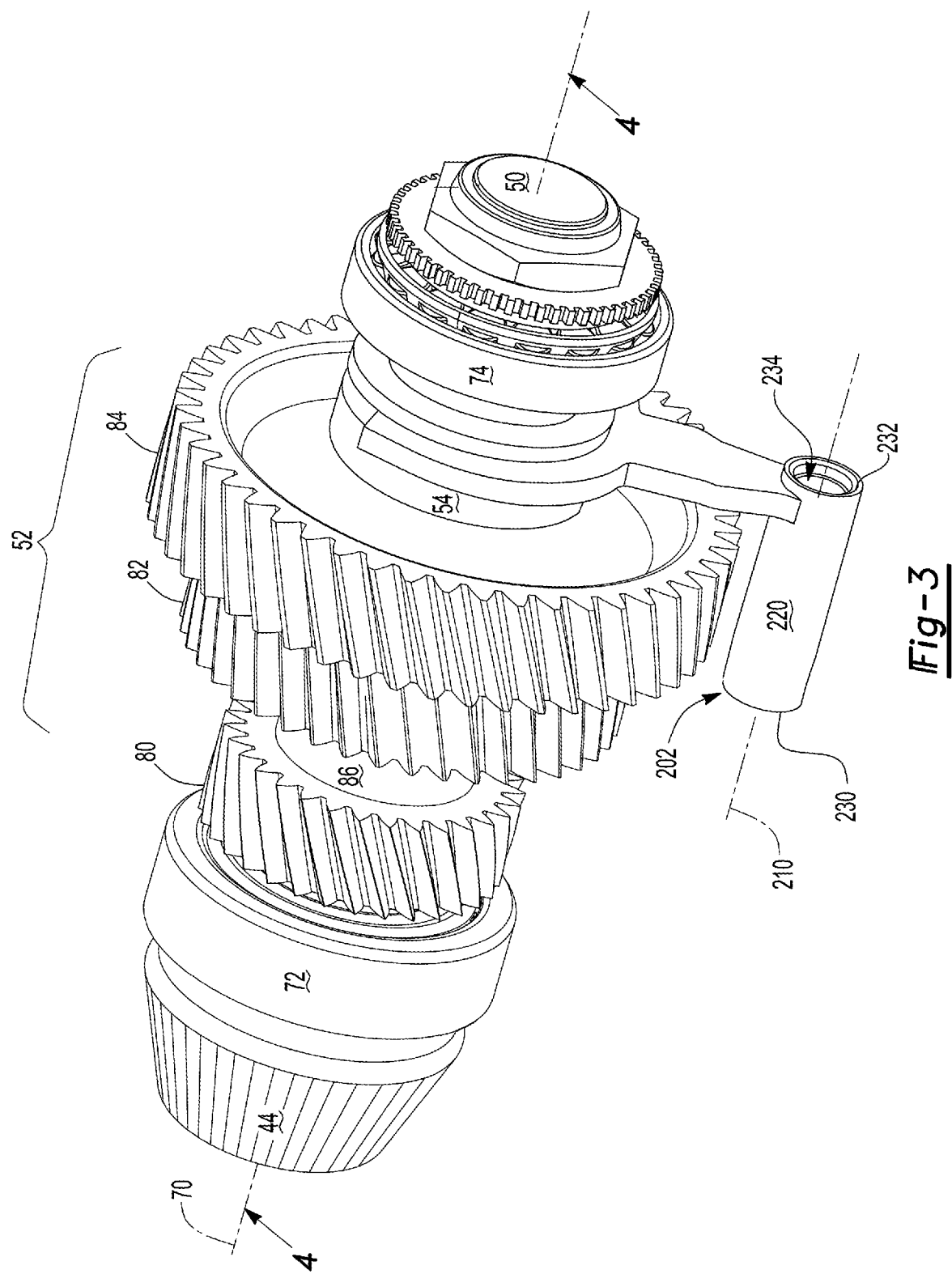
FIG. 3 is a perspective view of a portion of the transmission that is associated with a first shaft.
Figure 4:
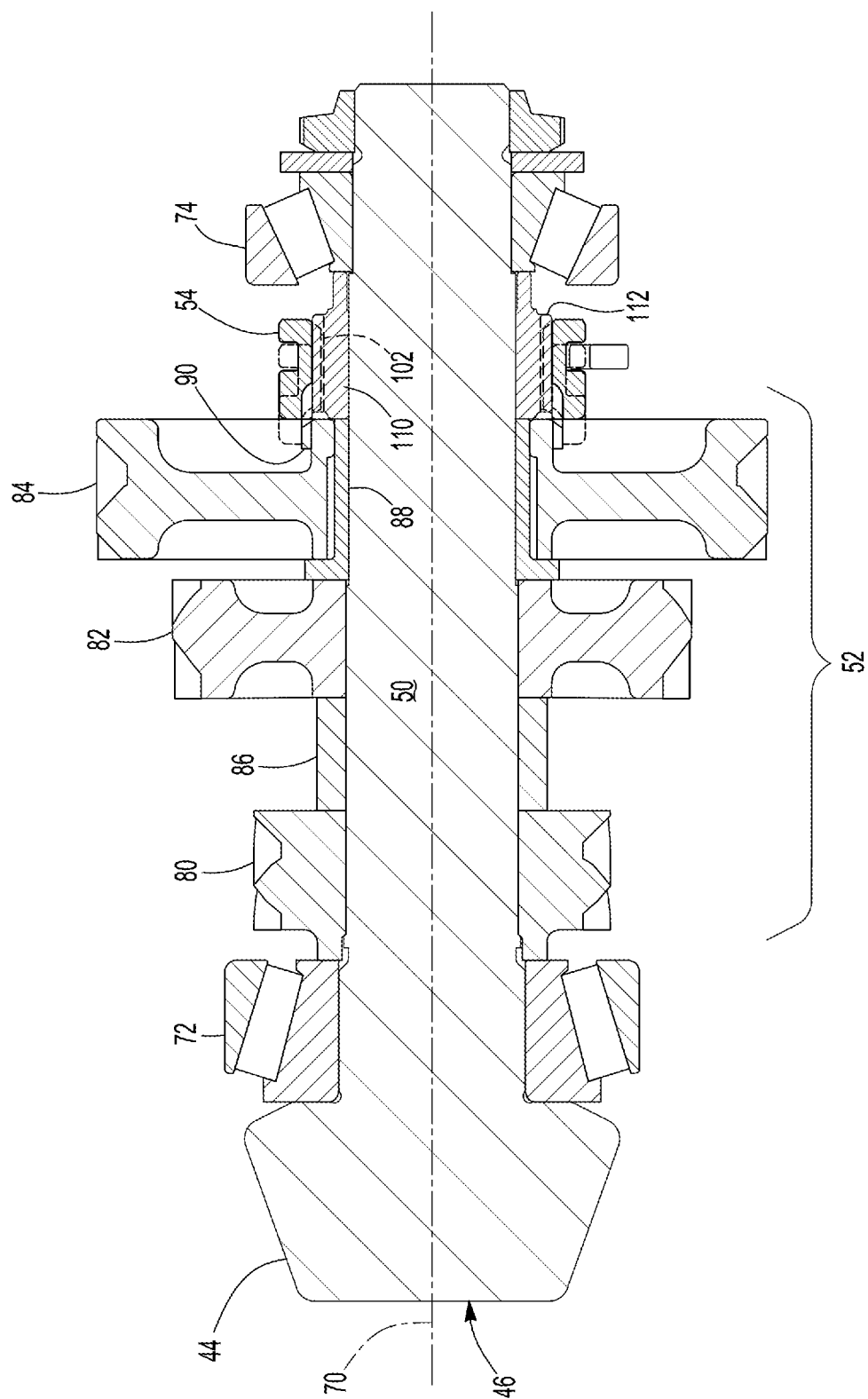
FIG. 4 is a section view along section line 4-4.
Figure 5:
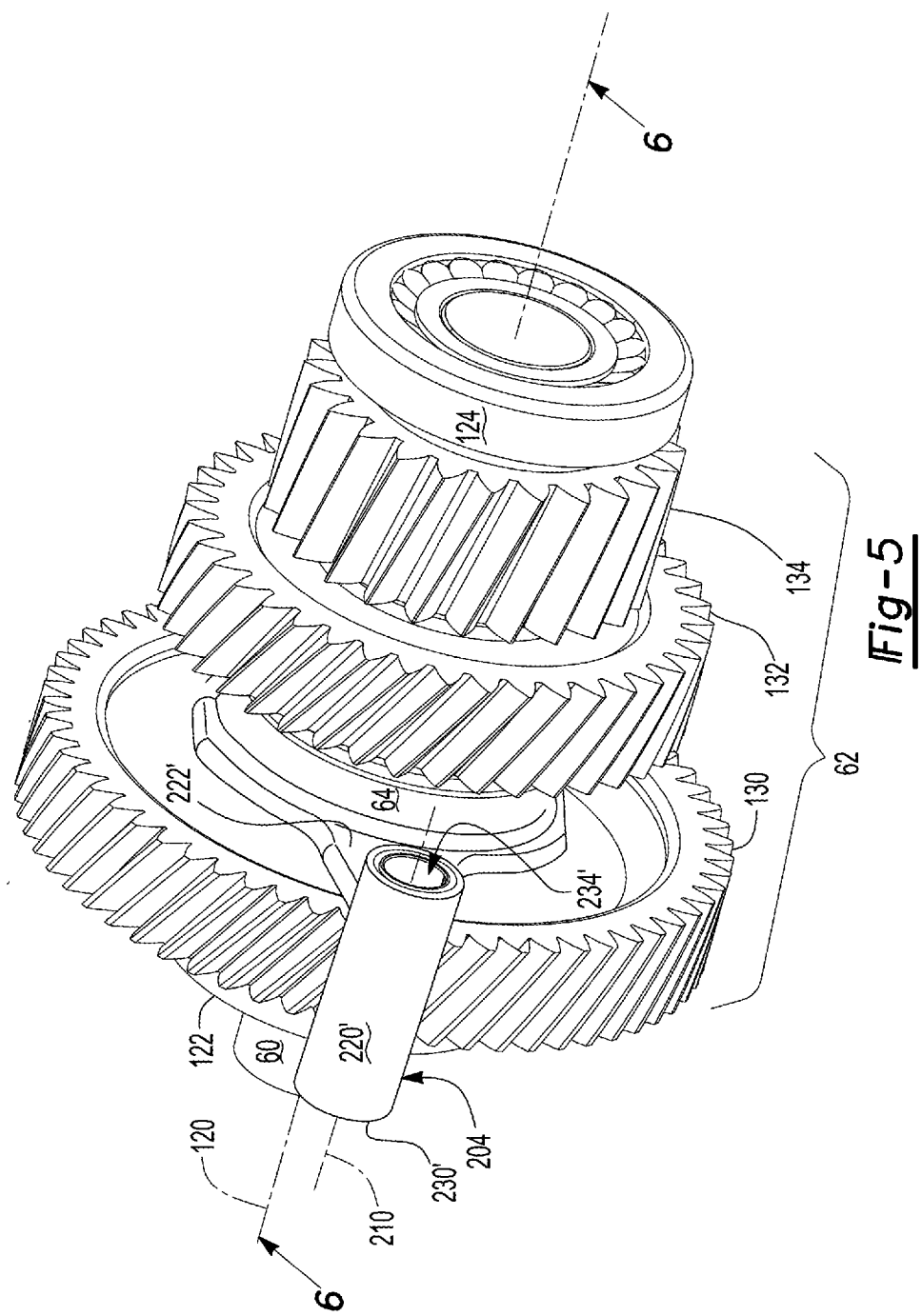
FIG. 5 is a perspective view of a portion of the transmission that is associated with a second shaft.
Figure 6:
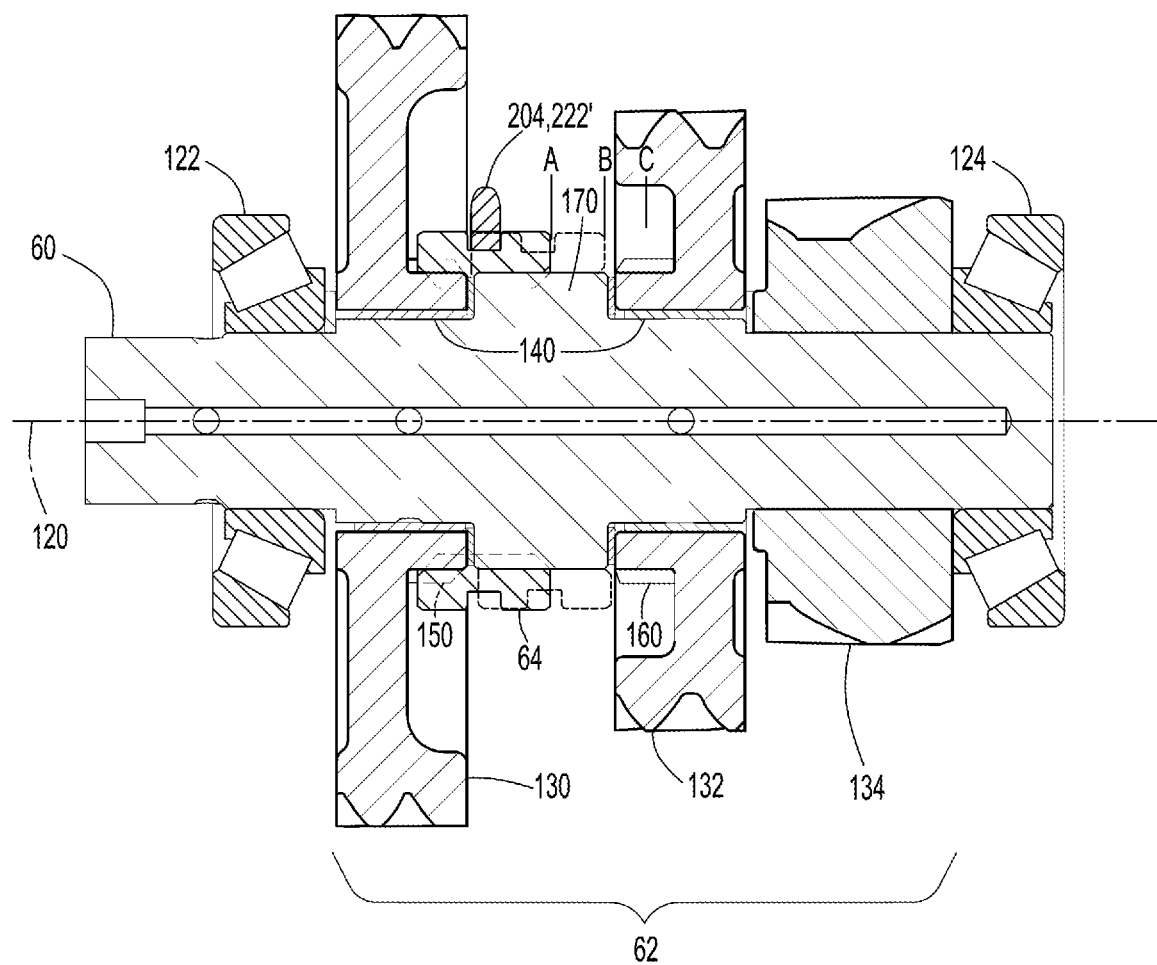
FIG. 6 is a section view along section line 6-6.

The transmission 34 may transmit torque between the torque source 20 and the differential assembly 30. Torque transmission may be bidirectional. In at least one configuration such as is shown in FIGS. 3 and 4, the transmission 34 may include a first shaft 50, a first set of gears 52, and a first shift collar 54. The transmission 34 may also include a second shaft 60, a second set of gears 62, and a second shift collar 64 as is best shown in FIGS. 5 and 6.

Referring primarily to FIGS. 3 and 4, the first shaft 50 may be rotatable about a first axis 70. As is shown in FIG. 1, the first axis 70 may be substantially perpendicular to the differential axis 40. The term "substantially perpendicular" is used herein to designate features such as axes that are the perpendicular or very close to perpendicular with respect to each other and includes features that are within ±2° of being perpendicular each other. For instance, the first shaft 50 may be rotatably supported by one or more bearings, such as a first bearing 72 and a second bearing 74. The first bearing 72 and the second bearing 74 may have any suitable configuration. For example, the first bearing 72 and the second bearing 74 may be configured as roller bearing assemblies that may encircle the first shaft 50. In at least one configuration, the first shaft 50 may be part of the drive pinion 46 or may be rotatable with the drive pinion 46.

The first set of gears 52 may include a plurality of gears that may be rotatable about the first axis 70. In the configuration shown, the first set of gears 52 includes a first drive gear 80, a second drive gear 82, and a third drive gear 84; however, it is to be understood that a greater or lesser number of gears may be provided. A member of the first set of gears 52 may be rotatable about the first axis 70 with the first shaft 50 when that gear is coupled to the first shaft 50. Conversely, the first shaft 50 may be rotatable about the first axis 70 with respect to a member of the first set of gears 52 that is decoupled from or not coupled to the first shaft 50. A member of the first set of gears 52 may be selectively coupled to the first shaft 50 with the first shift collar 54 as will be discussed in more detail below.

The first drive gear 80 may receive the first shaft 50. For example, the first drive gear 80 may have a through hole through which the first shaft 50 may extend. The first drive gear 80 may extend around the first axis 70 and the first shaft 50 and may have a plurality of teeth that may be arranged around and may face away from the first axis 70. The teeth of the first drive gear 80 may contact and may mate or mesh with teeth of a first gear of the second set of gears 62 as will be discussed in more detail below. In at least one configuration, the first drive gear 80 may be fixedly coupled to the first shaft 50 such that the first drive gear 80 is rotatable about the first axis 70 with the first shaft 50 and such that the first drive gear 80 does not rotate about the first axis 70 with respect to the first shaft 50. In at least one configuration, the first drive gear 80 may be axially positioned along the first axis 70 between the gear portion 44 and the second drive gear 82. For instance, the first drive gear 80 may be axially positioned between the first bearing 72 and a spacer 86.

The second drive gear 82 may receive the first shaft 50. For example, the second drive gear 82 may have a through hole through which the first shaft 50 may extend. The second drive gear 82 may extend around the first axis 70 and the first shaft 50 and may have a plurality of teeth that may be arranged around and may face away from the first axis 70. The teeth of the second drive gear 82 may contact and may mate or mesh with teeth of a second gear of the second set of gears 62 as will be discussed in more detail below. In at least one configuration, the second drive gear 82 may be fixedly coupled to the first shaft 50 such that the second drive gear 82 is rotatable about the first axis 70 with the first shaft 50 and such that the second drive gear 82 does not rotate about the first axis 70 with respect to the first shaft 50. In at least one configuration, the second drive gear 82 may be axially positioned along the first axis 70 between the first drive gear 80 and the third drive gear 84. In addition, the second drive gear 82 may be axially positioned closer to the third drive gear 84 than to the first drive gear 80. For instance, the spacer 86 may be positioned between the first drive gear 80 and the second drive gear 82 to separate or increase the axial distance between the first drive gear 80 and the second drive gear 82 to provide alignment with a corresponding member of the second set of gears 62, which may be arranged to accommodate the second shift collar 64 as will be discussed in more detail below. In addition, the second drive gear 82 may have a different diameter than the first drive gear 80. For example, the second drive gear 82 may have a larger diameter than the first drive gear 80.

The third drive gear 84 may receive the first shaft 50. For example, the third drive gear 84 may have a through hole through which the first shaft 50 may extend. The third drive gear 84 may extend around the first axis 70 and the first shaft 50 and may have a plurality of teeth that may be arranged around and may face away from the first axis 70. The teeth of the third drive gear 84 may contact and may mate or mesh with teeth of a third gear of the second set of gears 62 as will be discussed in more detail below. The third drive gear 84 may be rotatably disposed on the first shaft 50. A bearing or bushing 88 may be received in the hole of the third drive gear 84 to rotatably support the third drive gear 84 on the first shaft 50. The bushing 88 may also have a flange that may extend away from the first axis 70 and that may help separate the third drive gear 84 from the second drive gear 82.

As is best shown in FIG. 4, the third drive gear 84 may include clutch engagement teeth 90 that may be engaged by the first shift collar 54 to selectively couple the third drive gear 84 to the first shaft 50 as will be discussed in more detail below. The clutch engagement teeth 90 may have any suitable configuration. In the configuration shown, the clutch engagement teeth 90 are configured as a spline gear or spline teeth in which teeth may be arranged around the first axis 70 and may face away from and extend radially away from the first axis 70. Alternatively or in addition, the clutch engagement teeth 90 may be configured as a face gear in which teeth may the arranged around the first axis 70 and may extend axially from a side of the third drive gear 84 toward the first shift collar 54. The third drive gear 84 may be axially positioned along the first axis 70 between the second drive gear 82 and the first shift collar 54. In addition, the third drive gear 84 may have a different diameter than the first drive gear 80 and the second drive gear 82. For example, the third drive gear 84 may have a larger diameter than the second drive gear 82.

Figure 7:
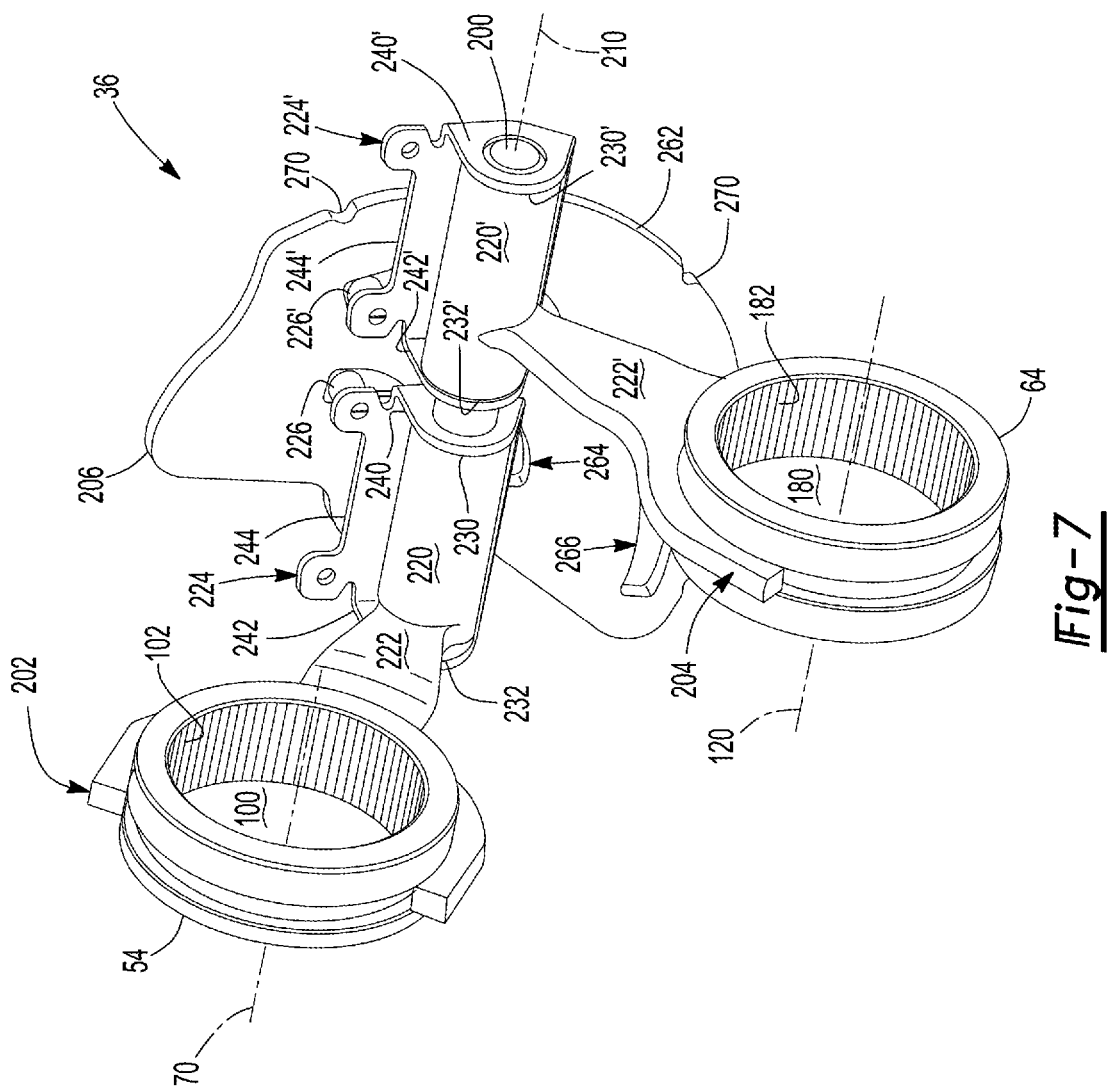
FIG. 7 is a perspective view of the shift mechanism.

The first shift collar 54 may be axially positioned between the third drive gear 84 and the second bearing 74. The first shift collar 54 may receive the first shaft 50 and may be rotatable about the first axis 70 with the first shaft 50. In addition, the first shift collar 54 may be moveable along the first axis 70 with respect to the first shaft 50 to selectively couple or selectively connect a member of the first set of gears 52 to the first shaft 50. For instance, the first shift collar 54 may selectively couple the third drive gear 84 to the first shaft 50 as is shown in phantom in FIG. 4 and as will be discussed in more detail below. In at least one configuration and as is best shown in FIG. 7, the first shift collar 54 may include a first shift collar hole 100 and a first shift collar spline 102.

The first shift collar hole 100 may extend along the first axis 70. The first shift collar hole 100 may be a through hole through which the first shaft 50 may extend.

The first shift collar spline 102 may operatively connect the first shift collar 54 to the first shaft 50. The first shift collar spline 102 may be disposed in the first shift collar hole 100 and may include spline teeth that may extend toward the first axis 70. The spline teeth may mesh or mate with corresponding spline teeth on the first shaft 50 or that are disposed on an intervening component that may be fixedly mounted to the first shaft 50, such as a first annular ring 110, which is best shown in FIG. 4. For instance, the first annular ring 110 may have spline teeth 112 that may extend away from the first axis 70 and that may mesh with the teeth of the first shift collar spline 102. The first annular ring 110 may at least partially encircle the first shaft 50 and may extend axially between the second bearing 74 and the third drive gear 84 and/or its bushing 88.

The first shift collar spline 102 may selectively engage the third drive gear 84 to permit or inhibit rotation of the third drive gear 84 with respect to the first shaft 50. The third drive gear 84 may be rotatable about the first axis 70 with respect to the first shaft 50 when the first shift collar 54 is disengaged from the third drive gear 84. For instance, the third drive gear 84 may be rotatable with respect to the first shaft 50 when the first shift collar spline 102 does not mate or mesh with the clutch engagement teeth 90 of the third drive gear 84 and thus the first shift collar 54 does not connect the third drive gear 84 to the first shaft 50. The third drive gear 84 may be rotatable about the first axis 70 with the first shaft 50 when the first shift collar 54 connects the third drive gear 84 to the first shaft 50, such as when the first shift collar spline 102 mates or meshes with the clutch engagement teeth 90 of the third drive gear 84. It is also contemplated that the first shift collar 54 may be provided with a face gear that may mate or mesh with clutch engagement teeth 90 of the third drive gear 84 that may also be configured as a face gear. In such a configuration, the first shift collar spline 102 may not mate or mesh with the clutch engagement teeth 90.

Referring primarily to FIGS. 5 and 6, the second shaft 60 may be spaced apart from the first shaft 50 and may be rotatable about a second axis 120. The second axis 120 may be disposed substantially parallel to the first axis 70. The term "substantially parallel" is used herein to designate features such as axes that are the parallel or very close to parallel with respect to each other and includes features that are within ±2° of being parallel each other. The second shaft 60 may be rotatably supported by one or more bearings, such as a first bearing 122 and a second bearing 124. The first bearing 122 and the second bearing 124 may have any suitable configuration. For instance, the first bearing 122 and the second bearing 124 may be configured as roller bearing assemblies that may encircle the second shaft 60. The second shaft 60 may be operatively connected to the torque source 20. For example, torque may be transmitted from the torque source 20 to the second shaft 60, and then torque may be transmitted from the second shaft 60 to the first shaft 50 via gears. In a configuration having an electrical power source, the second shaft 60 may be operatively connected to the rotor 26, such as by directly connecting a rotor shaft to the second shaft 60 or by using a connecting gear set 126, an example of which is best shown in FIG. 1. For instance, the connecting gear set 126 may have a first connecting gear that is rotatable with the rotor 26 and that meshes with a second connecting gear that is rotatable with the second shaft 60. In at least one configuration, the transmission 34 may be positioned on an opposite side of the differential assembly 30 from the torque source 20.

Referring again to FIGS. 5 and 6, the second set of gears 62 may include a plurality of gears that may be rotatable about the second axis 120. Each member of the second set of gears 62 may mesh with a different member of the first set of gears 52. In the configuration shown, the second set of gears 62 includes first gear 130, a second gear 132, and a third gear 134; however, it is to be understood that a greater or lesser number of gears may be provided. A member of the second set of gears 62 may be rotatable about the second axis 120 with the second shaft 60 when that gear is coupled to the second shaft 60. Conversely, the second shaft 60 may be rotatable about the second axis 120 with respect to a member of the second set of gears 62 that is decoupled from or not coupled to the second shaft 60. A member of the second set of gears 62 may be selectively coupled to the second shaft 60 with the second shift collar 64 as will be discussed in more detail below.

The first gear 130 may receive the second shaft 60. For example, the first gear 130 may have a through hole through which the second shaft 60 may extend. The first gear 130 may extend around the second axis 120 and the second shaft 60 and may have a plurality of teeth that may be arranged around and may face away from the second axis 120. The teeth of the first gear 130 may contact and may mate or mesh with teeth of the first drive gear 80 of the first set of gears 52. In at least one configuration, the first gear 130 may be rotatably disposed on the second shaft 60. A bearing or bushing 140 may be received in the hole of the first gear 130 and may rotatably support the first gear 130 on the second shaft 60.

As is best shown in FIG. 6, the first gear 130 may include clutch engagement teeth 150 that may be engaged by the second shift collar 64 to selectively couple the first gear 130 to the second shaft 60 as will be discussed in more detail below. The clutch engagement teeth 150 may have any suitable configuration. In the configuration shown, the clutch engagement teeth 150 are configured as a spline gear or spline teeth in which teeth may be arranged around the second axis 120 and may face away from and extend radially away from the second axis 120. Alternatively or in addition, the clutch engagement teeth 150 may be configured as a face gear in which teeth may the arranged around the second axis 120 and may extend axially from a side of the first gear 130 toward the second shift collar 64. The first gear 130 may be axially positioned along the second axis 120 between the first bearing 122 and the second gear 132.

The second gear 132 may receive the second shaft 60. For example, the second gear 132 may have a through hole through which the second shaft 60 may extend. The second gear 132 may extend around the second axis 120 and the second shaft 60 and may have a plurality of teeth that may be arranged around and may face away from the second axis 120. The teeth of the second gear 132 may contact and may mate or mesh with teeth of a second drive gear 82 of the first set of gears 52. In at least one configuration, the second gear 132 may be rotatably disposed on the second shaft 60. A bearing or bushing 140 may be received in the hole of the second gear 132 and may rotatably support the second gear 132 on the second shaft 60.

In at least one configuration, the second gear 132 may include second clutch engagement teeth 160 that may be engaged by the second shift collar 64 to selectively couple the second gear 132 to the second shaft 60 as will be discussed in more detail below. The second clutch engagement teeth 160 may have any suitable configuration. In the configuration shown, the second clutch engagement teeth 160 are configured as a spline gear or spline teeth in which teeth may be arranged around the second axis 120 and may face away from and extend radially away from the second axis 120. Alternatively or in addition, the second clutch engagement teeth 160 may be configured as a face gear in which teeth may be arranged around the second axis 120 and may extend axially from a side of the second gear 132 toward the second shift collar 64. The second gear 132 may be axially positioned along the second axis 120 between the first gear 130 and the third gear 134. For example, the second gear 132 may be axially positioned between the second shift collar 64 and the third gear 134. In addition, the second gear 132 may be axially positioned closer to the third gear 134 than to the first gear 130. For instance, a spacer 170 may be positioned between the first gear 130 and the second gear 132 to separate or increase the axial distance between the first gear 130 and the second gear 132 to provide sufficient room for moving the second shift collar 64 as will be discussed in more detail below. The spacer 170 may be integrally formed with the second shaft 60 or may be provided as a separate component that may extend from the second shaft 60. In addition, the second gear 132 may have a different diameter than the first gear 130. For example, the second gear 132 may have a smaller diameter than the first gear 130.

The third gear 134 may receive the second shaft 60. For example, the third gear 134 may have a through hole through which the second shaft 60 may extend. The third gear 134 may extend around the second axis 120 and the second shaft 60 and may have a plurality of teeth that may be arranged around and may face away from the second axis 120. The teeth of the third gear 134 may contact and may mate or mesh with teeth of the third drive gear 84 of the first set of gears 52 as will be discussed in more detail below. In at least one configuration, the third gear 134 may be fixedly coupled to the second shaft 60 such that the third gear 134 is rotatable about the second axis 120 with the second shaft 60 and such that the third gear 134 does not rotate about the second axis 120 with respect to the second shaft 60. In at least one configuration, the third gear 134 may be axially positioned along the second axis 120 between the second bearing 124 and the second drive gear 82. In addition, the third gear 134 may have a different diameter than the first gear 130 and the second gear 132. For instance, the third gear 134 may have a smaller diameter than the second gear 132.

The second shift collar 64 may be axially positioned between the first gear 130 and the second gear 132. The second shift collar 64 may receive the second shaft 60 and may be rotatable about the first axis 70 with the second shaft 60. In addition, the second shift collar 64 may be moveable along the second axis 120 with respect to the second shaft 60 to may selectively couple or selectively connect a member of the second set of gears 62 to the second shaft 60. For instance, the second shift collar 64 may selectively couple the first gear 130 or the second gear 132 to the second shaft 60 as will be discussed in more detail below. The second shift collar 64 may also decouple the first gear 130 and the second gear 132 from the second shaft 60 in an intermediate portion that is shown in phantom on FIG. 6. In at least one configuration and as is best shown in FIG. 7, the second shift collar 64 may include a second shift collar hole 180 and a second shift collar spline 182.

The second shift collar hole 180 may extend along the second axis 120. The second shift collar hole 180 may be a through hole through which the second shaft 60 may extend.

The second shift collar spline 182 may operatively connect the second shift collar 64 to the second shaft 60. The second shift collar spline 182 may be disposed in the second shift collar hole 180 and may include spline teeth that may extend toward the second axis 120. The spline teeth may mesh or mate with corresponding spline teeth on the second shaft 60 or and intervening component that may be fixedly mounted to the second shaft 60.

The second shift collar spline 182 may selectively engage the first gear 130 or the second gear 132 to permit or inhibit rotation of the first gear 130 or the second gear 132 with respect to the second shaft 60. For instance, the second shift collar spline 182 may mate or mesh with the clutch engagement teeth 150 of the first gear 130 to rotatably couple the first gear 130 to the second shaft 60 as shown in solid lines at position A in FIG. 6. The first gear 130 may be rotatable about the second axis 120 with respect to the second shaft 60 when the second shift collar 64 is disengaged from the first gear 130 or does not connect the first gear 130 to the second shaft 60. For instance, the first gear 130 may be rotatable about the second axis 120 with respect to the second shaft 60 when the second shift collar spline 182 does not mate or mesh with the clutch engagement teeth 150 of the first gear 130.

The second shift collar spline 182 may not mate or mesh with the clutch engagement teeth 150 of the first gear 130 and the second clutch engagement teeth 160 of the second gear 132 when in the intermediate position shown with phantom lines at position B, thereby permitting the second shaft 60 to rotate with respect to the first gear 130 and the second gear 132.

The second shift collar spline 182 may mate or mesh with the second clutch engagement teeth 160 of the second gear 132 to rotatably couple the second gear 132 to the second shaft 60 when the second shift collar 64 is moved to the right from the perspective shown in FIG. 6 to position C. The second gear 132 may be rotatable about the second axis 120 with respect to the second shaft 60 when the second shift collar 64 is disengaged from the second gear 132 or does not connect the second gear 132 to the second shaft 60. For instance, the second gear 132 may be rotatable about the second axis 120 with respect to the second shaft 60 when the second shift collar spline 182 does not mate or mesh with the second clutch engagement teeth 160 of the second gear 132.

It is also contemplated that the second shift collar 64 may be provided with a face gear that may mate or mesh with clutch engagement teeth 150 of the first gear 130 that may also be configured as a face gear, may be provided with a face gear that may mate or mesh with the second clutch engagement teeth 160 of the second gear 132 that may be configured as a face gear, or combinations thereof.

Referring primarily to FIGS. 2 and 7, the shift mechanism 36 may control positioning of a shift collar, such as the first shift collar 54 and the second shift collar 64. In at least one configuration, the shift mechanism 36 may include a shift rail 200, a first shift fork 202, a second shift fork 204, a sector cam 206, or combinations thereof.

The shift rail 200 may extend along a shift rail axis 210. The shift rail axis 210 may be disposed substantially parallel to the first axis 70, the second axis 120, or both. In at least one configuration, the shift rail axis 210 may be disposed closer to the first axis 70 than to the second axis 120. The shift rail 200 may be fixedly positioned such that the shift rail 200 may not move along or rotate about the shift rail axis 210. The shift rail 200 may be spaced apart from the sector cam 206 and may support the first shift fork 202 and the second shift fork 204.

Referring to FIGS. 3 and 7, the first shift fork 202 may operatively connect the first shift collar 54 to the sector cam 206. The first shift fork 202 may be slidable along the shift rail axis 210 with respect to the shift rail 200. In at least one configuration, the first shift fork 202 may include a tubular portion 220 and a fork arm 222. Optionally, a shift bracket 224 may be associated with the first shift fork 202.

The tubular portion 220 may receive the shift rail 200. In at least one configuration, the tubular portion 220 may have a first end 230, a second end 232, and a shift fork hole 234.

The first end 230 may face toward the second shift fork 204.

The second end 232 may be disposed opposite the first end 230. As such, the second end 232 may face away from the second shift fork 204.

The shift fork hole 234 may extend from the first end 230 to the second end 232. The shift rail 200 may extend through the shift fork hole 234.

The fork arm 222 may extend from the tubular portion 220 to the first shift collar 54. The fork arm 222 may have any suitable configuration. For instance, the fork arm 222 may have a pair of prongs that may be received in a groove of the first shift collar 54 and that may allow the first shift collar 54 to rotate about the first axis 70 with respect to the prongs. The fork arm 222 may be disposed proximate the second end 232 of the tubular portion 220.

Referring primarily to FIG. 7, the shift bracket 224 may operatively connect the first shift fork 202 to the sector cam 206. For instance, the shift bracket 224 may be slidable along the shift rail 200 with the first shift fork 202 and may support a guide feature 226 that may engage the sector cam 206. In at least one configuration, the shift bracket 224 may have a first flange 240, a second flange 242, and a body portion 244.

The first flange 240 may be disposed at a first end of the body portion 244. The first flange 240 may define a hole through which the shift rail 200 may extend. The first flange 240 may engage the first end 230 of the tubular portion 220.

The second flange 242 may be disposed at a second end of the body portion 244 that may be disposed opposite the first end. The second flange 242 may define a hole through which the shift rail 200 may extend. The second flange 242 may engage the second end 232 of the tubular portion 220. As such, the first flange 240 and the second flange 242 may engage opposite ends of the first shift fork 202 and the first shift fork 202 may be positioned between the first flange 240 and the second flange 242 to inhibit relative axial movement of the shift bracket 224 with respect to first shift fork 202.

The body portion 244 may extend from the first flange 240 to the second flange 242. The body portion 244 may extend generally parallel to the shift rail 200 and may be spaced apart from the shift rail 200 and the sector cam 206.

The guide feature 226 may operatively connect the first shift fork 202 to the sector cam 206. The guide feature 226, which may be referred to as a first guide feature, may extend from the body portion 244 in a direction that extends toward the sector cam 206. The guide feature 226 may have any suitable configuration. For instance, the guide feature 226 may be a roller that may be received in a first groove of the sector cam 206 as will be discussed in more detail below. The guide feature 226 may be disposed closer to the first flange 240 than to the second flange 242. It is also contemplated that the shift bracket 224 may be omitted and that the guide feature 226 may be provided with the first shift fork 202.

The second shift fork 204 may be spaced apart from the first shift fork 202. The second shift fork 204 may operatively connect the second shift collar 64 to the sector cam 206. The second shift fork 204 may have a similar configuration as the first shift fork 202. The second shift fork 204 may be slidable along the shift rail axis 210 with respect to the shift rail 200. In at least one configuration, the second shift fork 204 may include a tubular portion 220' and a fork arm 222'. Optionally, a shift bracket 224' may be associated with the second shift fork 204.

The tubular portion 220' may receive the shift rail 200. In at least one configuration, the tubular portion 220' may have a first end 230', a second end 232', and a shift fork hole 234'.

The first end 230' may face away from the first shift fork 202.

The second end 232' may be disposed opposite the first end 230'. As such, the second end 232' may face toward the first shift fork 202.

The shift fork hole 234' may extend from the first end 230' to the second end 232'. The shift rail 200 may extend through the shift fork hole 234'.

The fork arm 222' may extend from the tubular portion 220' of the second shift fork 204 to the second shift collar 64. The fork arm 222' may have any suitable configuration. For instance, the fork arm 222' may have a pair of prongs that may be received in a groove of the second shift collar 64 and that may allow the second shift collar 64 to rotate about the second axis 120 with respect to the prongs. In at least one configuration, the fork arm 222' may be disposed closer to the first end 230' of the tubular portion 220' than to the second end 232'.

The shift bracket 224' may operatively connect the second shift fork 204 to the sector cam 206. For instance, the shift bracket 224' may be slidable along the shift rail 200 with the second shift fork 204 and may support a guide feature 226' that may engage the sector cam 206. The shift bracket 224' may have the same configuration as the shift bracket 224. In at least one configuration, the shift bracket 224' may have a first flange 240', a second flange 242', and a body portion 244'.

The first flange 240' may be disposed at a first end of the body portion 244'. The first flange 240' may define a hole through which the shift rail 200 may extend. The first flange 240' may engage the first end 230' of the tubular portion 220'.

The second flange 242' may be disposed at a second end of the body portion 244' that may be disposed opposite the first end. The second flange 242' may define a hole through which the shift rail 200 may extend. The second flange 242' may engage the second end 232' of the tubular portion 220'. As such, the first flange 240' and the second flange 242' may engage opposite ends of the second shift fork 204 and the second shift fork 204 may be positioned between the first flange 240' and the second flange 242' to inhibit relative axial movement of the shift bracket 224' with respect to second shift fork 204.

The body portion 244' may extend from the first flange 240' to the second flange 242'. The body portion 244' may extend generally parallel to the shift rail 200 and may be spaced apart from the shift rail 200 and the sector cam 206.

The guide feature 226' may operatively connect the second shift fork 204 to the sector cam 206. The guide feature 226', which may be referred to as a second guide feature, may extend from the body portion 244' in a direction that extends toward the sector cam 206. The guide feature 226' may have the same configuration as the guide feature 226 that is associated with the first shift fork 202. For instance, the guide feature 226' may be a roller that may be received in a second groove of the sector cam 206 as will be discussed in more detail below. The guide feature 226' may be axially positioned closer to the second flange 242' than to the first flange 240'. It is also contemplated that the shift bracket 224' may be omitted and that the guide feature 226' may be provided with the second shift fork 204.

Referring primarily to FIGS. 2 and 7, the sector cam 206 may be operatively connected to the first shift collar 54, the second shift collar 64, or both. The sector cam 206 may be spaced apart from the transmission 34 and the shift rail 200. In at least one configuration, the sector cam 206 may have a generally flat or planar configuration.

As is best shown in FIG. 2, the sector cam 206 may be rotatable about a sector cam axis 250. The sector cam axis 250 may be disposed substantially perpendicular to the first axis 70, the second axis 120, the shift rail axis 210, or combinations thereof. Rotation of the sector cam 206 about the sector cam axis 250 may control movement of the first shift collar 54 along the first axis 70, may control movement of the second shift collar 64 along the second axis 120, or both. In at least one configuration, the sector cam 206 may have a coupling feature 260 and an arcuate exterior side 262. The sector cam 206 may define one or more grooves, such as a first groove 264 and a second groove 266.

The coupling feature 260 may facilitate coupling of the sector cam 206 to an actuator that may rotate the sector cam 206 about the sector cam axis 250. The coupling feature 260 may have any suitable configuration. For instance the coupling feature 260 may have a male configuration, a female configuration, or combinations thereof. The actuator may have any suitable configuration. For instance, the actuator may be an electrical actuator, mechanical actuator, electro-mechanical actuator, or the like.

The arcuate exterior side 262 may face away from the sector cam axis 250. The arcuate exterior side 262 or a portion thereof may extend along an arc, such as an arc that may be radially disposed with respect to the sector cam axis 250. A plurality of detent features 270 may be provided with the arcuate exterior side 262. The detent features 270 may be spaced apart from each other and may be positioned to correspond with rotational positions of the sector cam 206, such as the positions shown in FIGS. 8-11. The detent features 270 may have any suitable configuration. For instance, a detent feature 270 may be configured as an indentation that may extend toward the sector cam axis 250. A detent feature 270 may be engaged by a detent mechanism 272, which is best shown in FIGS. 8-11. The detent feature 270 may be mounted to a stationary component, such as a housing of the axle assembly 10. The detent feature 270 may help hold the sector cam 206 in a desired rotational position. The detent mechanism 272 may slide along the arcuate exterior side 262 when the sector cam 206 is rotated about the sector cam axis 250 between different rotational positions and their associated detent features 270.

Referring primarily to FIG. 2, the first groove 264 may guide movement of the first shift fork 202 and thus guide movement of the first shift collar 54. The first groove 264 may be defined by the sector cam 206 such that the first groove 264 may be completely disposed inside the sector cam 206 or encircled by the sector cam 206. The first groove 264 may be spaced apart from the sector cam axis 250 and the second groove 266 and may receive the guide feature 226 of the first shift fork 202. The guide feature 226 may extend into the first groove 264. The first groove 264 may be radially positioned between the sector cam axis 250 and the arcuate exterior side 262. For instance, the first groove 264 may be radially positioned between the coupling feature 260 and the second groove 266. As such, the first groove 264 may be positioned closer to the sector cam axis 250 than the second groove 266 is positioned to the sector cam axis 250.

The first groove 264 may extend in a nonlinear manner between a first end and a second end. In at least one configuration, the first groove 264 may have a first groove side 280 and a second groove side 282.

The first groove side 280 and the second groove side 282 may be spaced apart from each other and may extend between the first end and the second end of the first groove 264. For instance, the first groove side 280 and the second groove side 282 may be mirror images of each other and may be equidistantly spaced from each other. The first groove side 280 and the second groove side 282 may be disposed substantially parallel to each other in one or more embodiments. The first groove side 280 and the second groove side 282 may cooperate to constrain and control axial movement of the first shift fork 202. For example, the guide feature 226 of the first shift fork 202 may engage the first groove side 280 to inhibit movement of the first shift fork 202 to the right from the perspective shown while the guide feature 226 may engage the second groove side 282 to inhibit movement of the first shift fork 202 to the left from the perspective shown.

The second groove 266 may guide movement of the second shift fork 204 and thus guide movement of the second shift collar 64. The second groove 266 may be defined by the sector cam 206 such that the second groove 266 may be completely disposed inside the sector cam 206 or encircled by the sector cam 206. The second groove 266 may be spaced apart from the first groove 264 and the arcuate exterior side 262 and may receive the guide feature 226' of the second shift fork 204. The guide feature 226' may extend into the second groove 266. The second groove 266 may be radially positioned between the sector cam axis 250 and the arcuate exterior side 262. For example, the second groove 266 may be radially positioned between the first groove 264 and the arcuate exterior side 262.

The second groove 266 may extend in a nonlinear manner between a first end and a second end. The second groove 266 may have a greater length between the first end and the second end than the first groove 264. In at least one configuration, the second groove 266 may have a first groove side 280' and a second groove side 282'.

The first groove side 280' and the second groove side 282' may be spaced apart from each other and may extend between the first end and the second end of the second groove 266. For instance, the first groove side 280' and the second groove side 282' may be mirror images of each other and may be equidistantly spaced from each other. The first groove side 280' and the second groove side 282' may be disposed substantially parallel to each other in one or more embodiments. The first groove side 280' and the second groove side 282' may cooperate to constrain and control axial movement of the second shift fork 204. For example, the guide feature 226' of the second shift fork 204 may engage the first groove side 280' to inhibit movement of the second shift fork 204 to the right from the perspective shown while the guide feature 226' may engage the second groove side 282' to inhibit movement of the second shift fork 204 to the left from the perspective shown.

Referring to FIGS. 8-11, examples that illustrate operation of the shift mechanism 36 and movement of the first shift collar 54 and the second shift collar 64 will now be described. Rotation of the sector cam 206 and shifting of a shift collar may occur in response to an operator command, may be automated, or combinations thereof. In at least one configuration, a shift may be executed when the rotational speed of a shift collar and the gear that is being engaged or disengaged are sufficiently synchronized. Sufficient synchronization to permit shifting or movement of a collar may be attained using a synchronizer, by controlling the rotational speed of the first shaft 50, by controlling the rotational speed of the second shaft 60, or combinations thereof.

In FIGS. 8-11 examples of shift collar positions are shown; however, it is to be understood that the shift collar positions may be rearranged or additional shift collar positions may be added, in which case the length of the first groove 264, the length of the second groove 266, the manner in which the first groove 264 and the second groove 266 bend or jog with respect to each other, or combinations thereof, may differ from the example shown.

Figure 8:
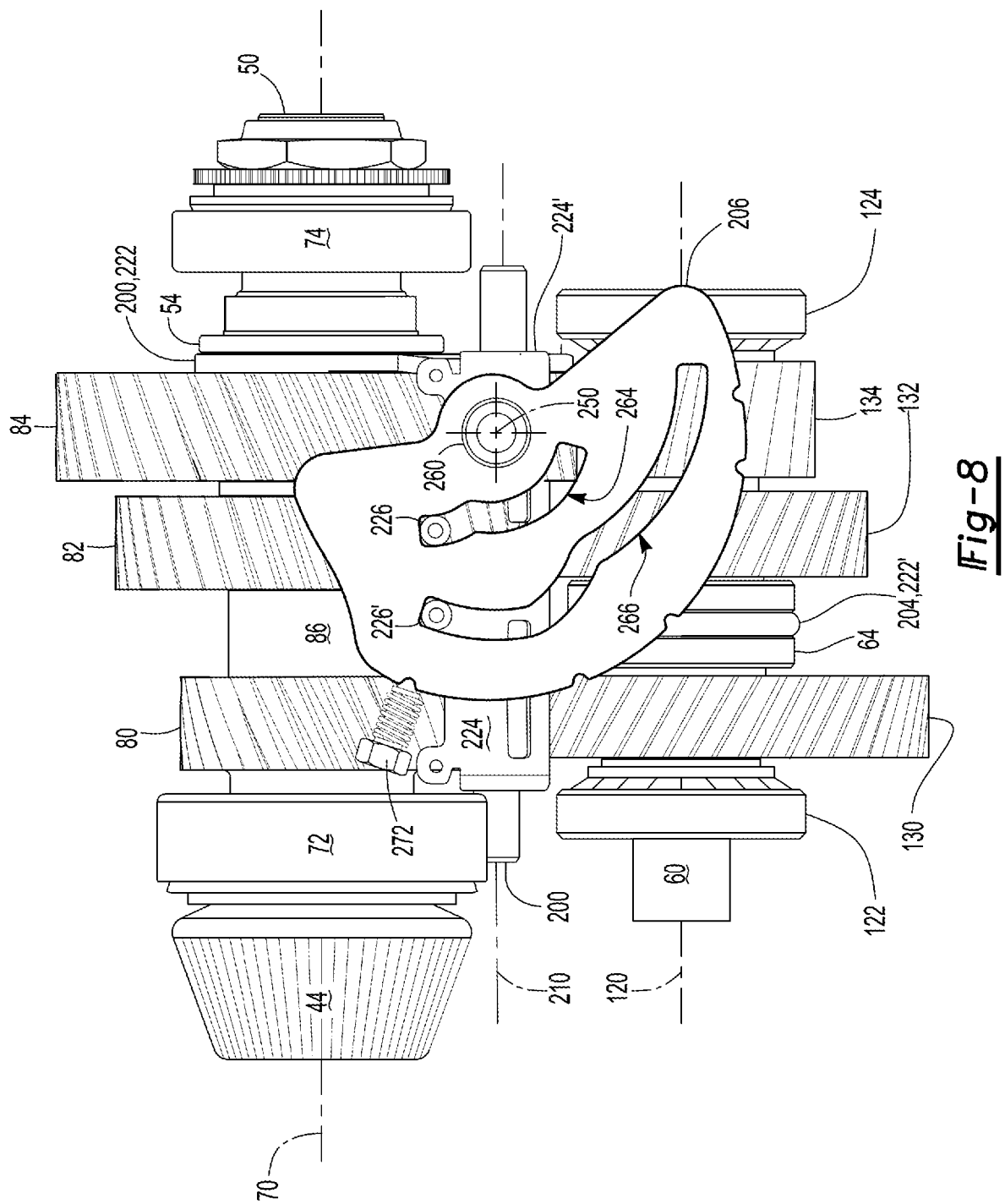
FIG. 8 is a side view showing the shift mechanism in a low-speed position.

Referring to FIG. 8, the sector cam 206 is shown in a low-speed position. The first shift collar 54 may couple the third drive gear 84 to the first shaft 50 such that the third drive gear 84 is rotatable with the first shaft 50. The second shift collar 64 may not couple the first gear 130 or the second gear 132 to the second shaft 60. As such, torque may be transmitted between the first shaft 50 and the second shaft 60 via the third drive gear 84 and the third gear 134. The guide feature 226 of the first shift fork 202 may be disposed adjacent to the first end of the first groove 264 and the guide feature 226' of the second shift fork 204 may be disposed adjacent to the first end of the second groove 266 when the sector cam 206 is in the low-speed position.

Figure 9:
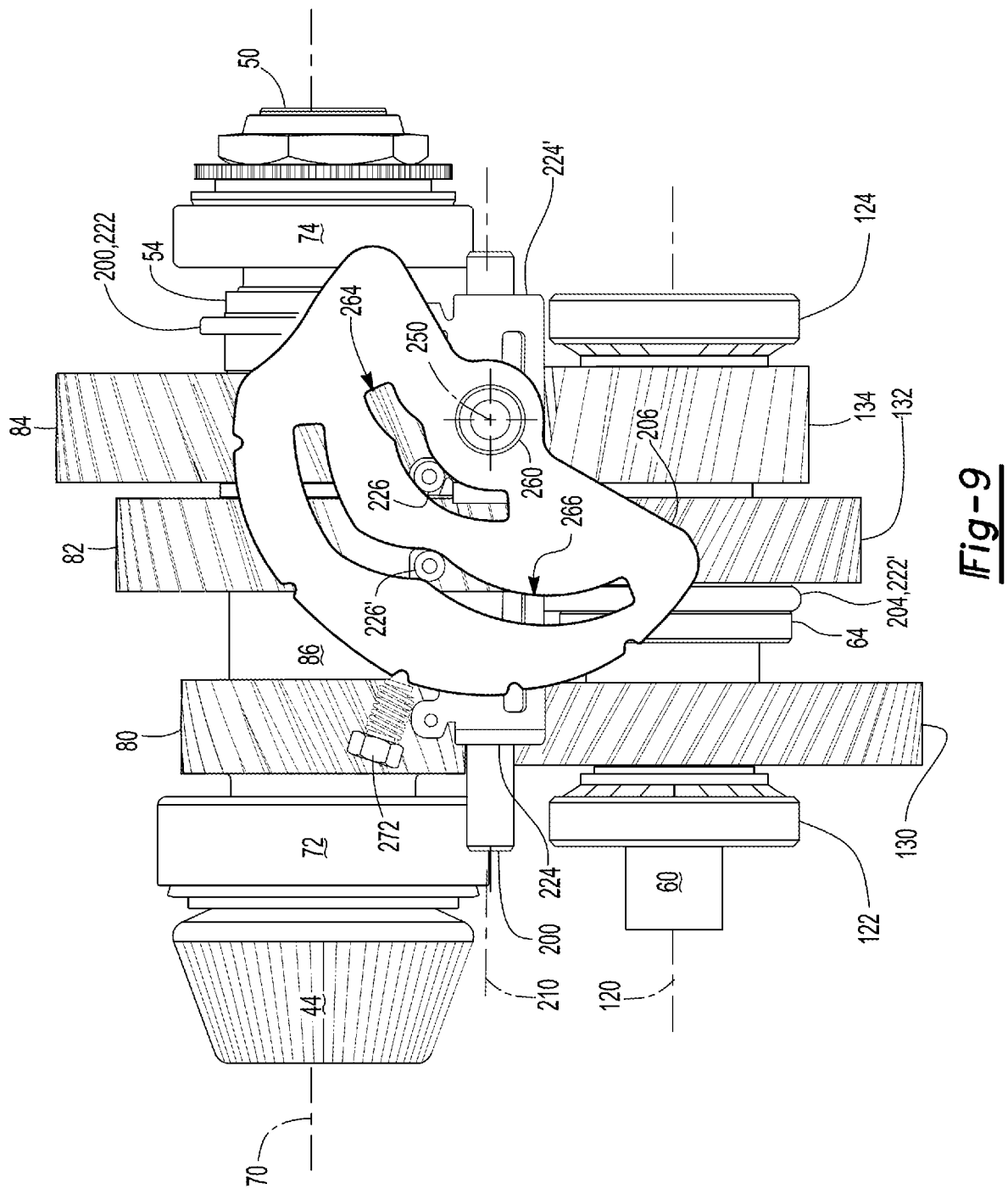
FIG. 9 is side view showing the shift mechanism in a mid-speed position.

Referring to FIG. 9, the sector cam 206 is shown in a mid-speed position. The first shift collar 54 may not couple the third drive gear 84 to the first shaft 50 and is moved to the right from the position shown in FIG. 8. The second shift collar 64 is moved to the right from the position shown in FIG. 8 and may couple the second gear 132 to the second shaft 60 but may not couple the first gear 130 to the second shaft 60. As such, torque may be transmitted between the first shaft 50 and the second shaft 60 via the second drive gear 82 and the second gear 132. The guide feature 226 of the first shift fork 202 and the guide feature 226' of the second shift fork 204 may be disposed closer to the sector cam axis 250 when the sector cam 206 is in the mid-speed position as compared to the low-speed position.

Figure 10:
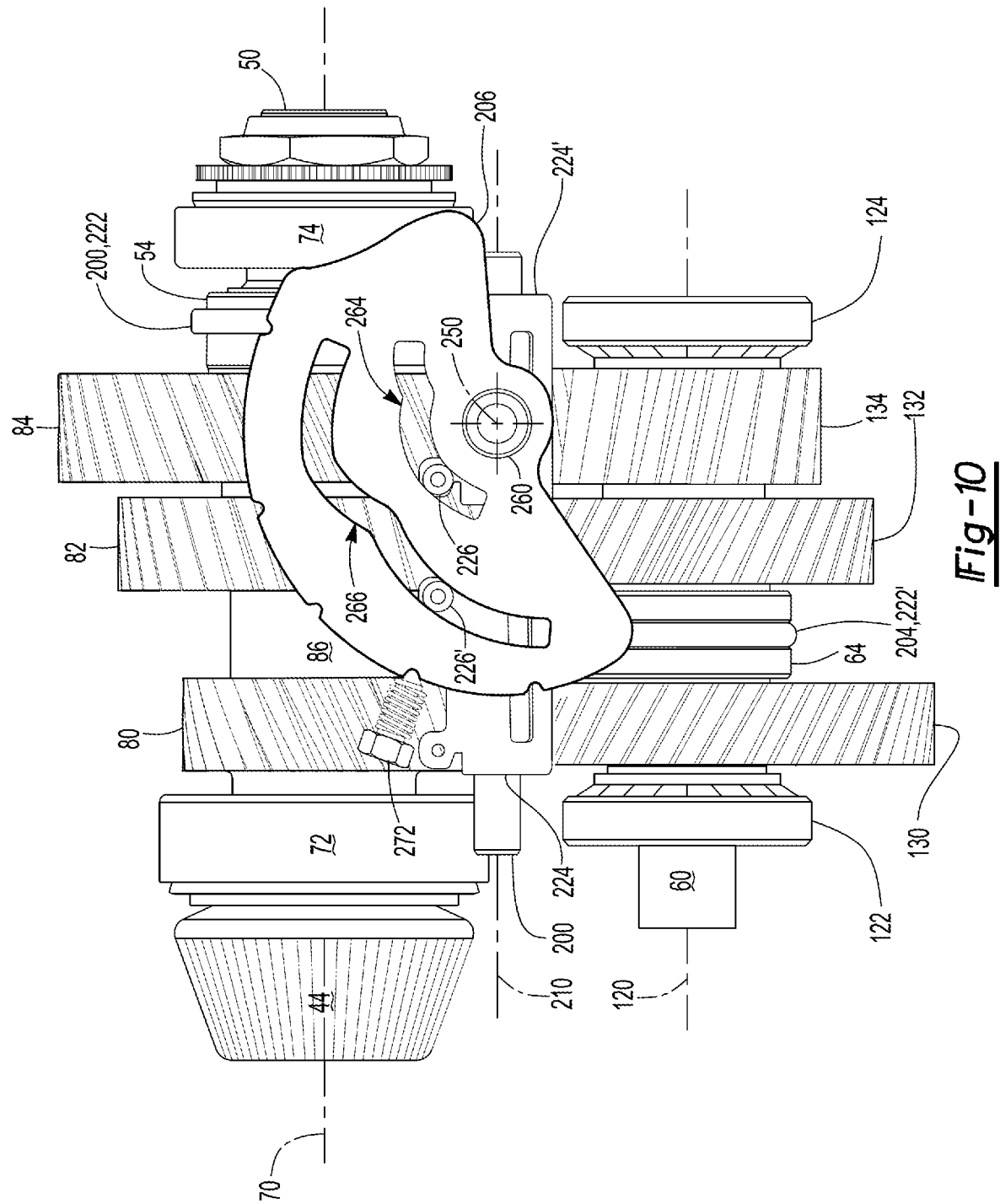
FIG. 10 is a side view showing the shift mechanism in a neutral position.

Referring to FIG. 10, the sector cam 206 is shown in a neutral position. The first shift collar 54 is in the same position as in FIG. 9 may not couple the third drive gear 84 to the first shaft 50. The second shift collar 64 is in the same position as FIG. 8 and may not couple the first gear 130 or the second gear 132 to the second shaft 60. As such, torque may not be transmitted between the first shaft 50 and the second shaft 60. The guide feature 226 of the first shift fork 202 may be disposed at the same distance from the sector cam axis 250 in the neutral and mid-speed positions. The guide feature 226' of the second shift fork 204 may be disposed further from the sector cam axis 250 in the neutral position as compared to the mid-speed position.

Figure 11:
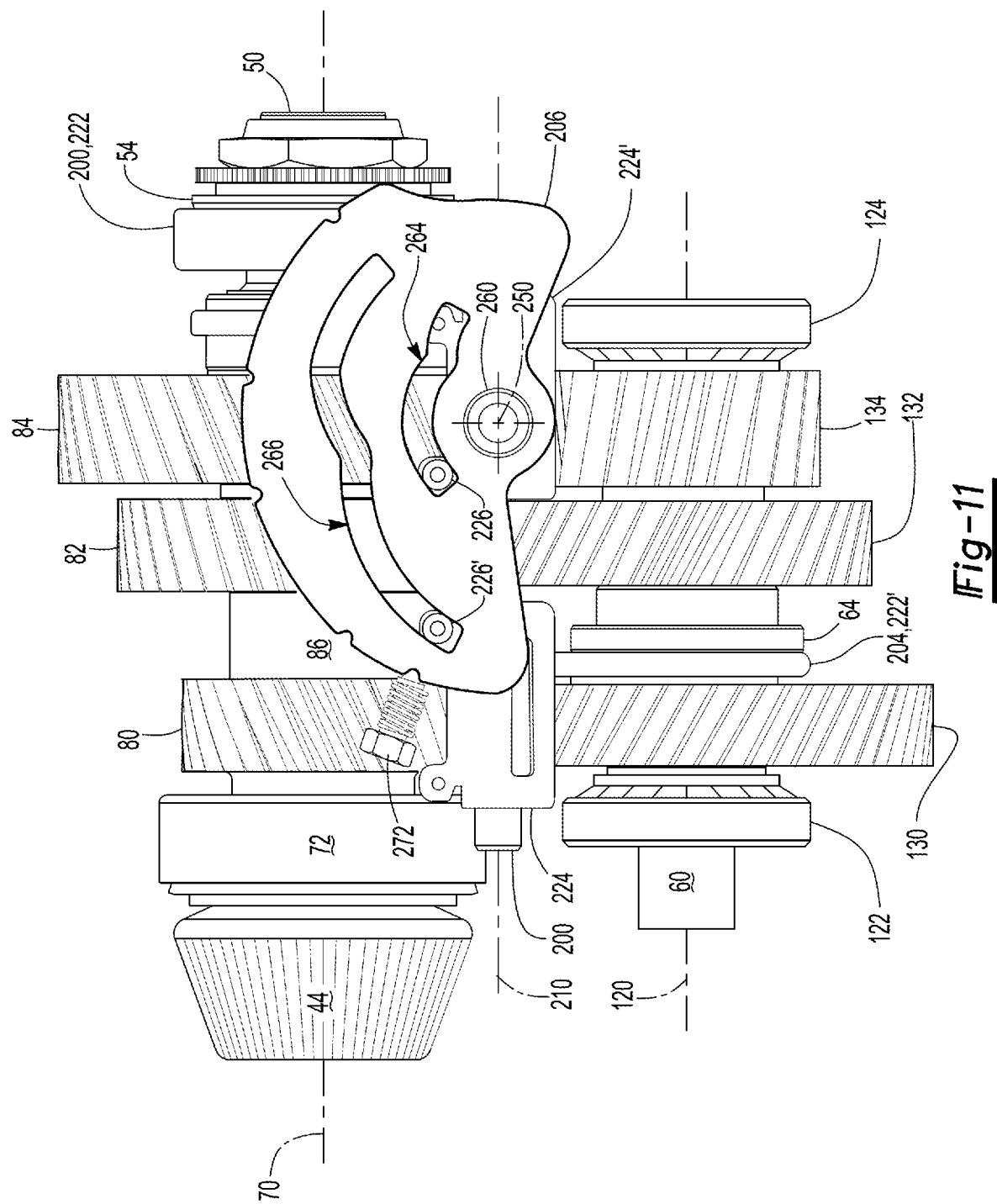
FIG. 11 is a side view showing the shift mechanism in a high-speed position.

Referring to FIG. 11, the sector cam 206 is shown in a high-speed position. The first shift collar 54 is in the same position as in FIG. 9 and may not couple the third drive gear 84 to the first shaft 50. The second shift collar 64 is moved to the left from the position shown in FIG. 8 to couple the first gear 130 to the second shaft 60 but does not couple the second gear 132 to the second shaft 60. As such, torque may be transmitted between the first shaft 50 and the second shaft 60 via the first drive gear 80 and the first gear 130. The guide feature 226 of the first shift fork 202 may be disposed adjacent to the second end of the first groove 264 and the guide feature 226' of the second shift fork 204 may be disposed adjacent to the second end of the second groove 266 when the sector cam 206 is in the high-speed position.

An axle assembly as discussed above may allow a torque source and a transmission to be arranged on opposite sides of a differential assembly. In a configuration in which the torque source is an electric motor such a configuration may help thermally separate the electric motor and heat generated by its fast-spinning rotor bearings (which may rotate at speeds greater than 50,000 rpm) from other components of the axle assembly, such as the transmission and lubricant of the axle assembly. This thermal separation may improve thermal management of the axle assembly and may reduce lubricant heating, which may help improve lubricant life. In addition, such an arrangement may provide better weight distribution by locating the center of mass of the axle assembly closer to the axle shafts as compared to a configuration in which the electric motor and transmission extend from the same side of the housing assembly. As a result, the "standout" or distance the housing assembly extends from the axle shafts may be reduced and housing structural integrity may be improved as compared to a configuration in which the electric motor and transmission extend from the same side of the housing assembly. An axle assembly having a sector cam as described above may allow a compact shift mechanism to be provided, which may help reduce package space, weight, associated cost, or combinations thereof. In addition, a sector cam may allow shift collars to be actuated simultaneously or independently and with a high degree of accuracy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a first shaft that is rotatable about a first axis;
   a second shaft that is rotatable about a second axis;
   a first set of gears that is rotatable about the first axis; and
   a second set of gears that is rotatable about the second axis, wherein each member of the second set of gears meshes with a different member of the first set of gears;
   a first shift collar that is rotatable about the first axis with the first shaft and moveable along the first axis with respect to the first shaft to selectively connect a member of the first set of gears to the first shaft;
   a second shift collar that is rotatable about the second axis with the second shaft and moveable along the second axis with respect to the second shaft to selectively connect a member of the second set of gears to the second shaft; and
   a sector cam that is rotatable about a sector cam axis and that is operatively connected to the first shift collar and to the second shift collar, wherein rotation of the sector cam about the sector cam axis controls movement of the first shift collar along the first axis and controls movement of the second shift collar along the second axis, wherein the first set of gears includes a first drive gear, a second drive gear, and a third drive gear, the first drive gear and the second drive gear are fixedly coupled to the first shaft, and the third drive gear is rotatably disposed on the first shaft such that that third drive gear is rotatable about the first axis with respect to the first shaft when the first shift collar does not connect the third drive gear to the first shaft and the third drive gear is rotatable with the first shaft when the first shift collar connects the third drive gear to the first shaft.

2. The axle assembly of claim 1 wherein the second set of gears includes a first gear, a second gear, and a third gear that mesh with the first drive gear, the second drive gear, and the third drive gear, respectively, wherein the third gear is fixedly coupled to the second shaft, and the first gear and the second gear are rotatably disposed on the second shaft and selectively couplable to the second shaft with the second shift collar.

3. The axle assembly of claim 2 wherein the first shift collar couples the third drive gear to the first shaft such that the third drive gear is rotatable with the first shaft and the second shift collar does not couple the first gear or the second gear to the second shaft when the sector cam is in a low-speed position.

4. The axle assembly of claim 2 wherein the first shift collar does not couple the third drive gear to the first shaft and the second shift collar couples the second gear to the second shaft when the sector cam is in a mid-speed position.

5. The axle assembly of claim 2 wherein the first shift collar does not couple the third drive gear to the first shaft and the second shift collar couples the first gear to the second shaft when the sector cam is in a high-speed position.

6. The axle assembly of claim 2 wherein the first shift collar does not couple the third drive gear to the first shaft and the second shift collar does not couple the first gear or the second gear to the second shaft when the sector cam is in a neutral position.

7. The axle assembly of claim 2 wherein the second drive gear is axially positioned along the first shaft between the first drive gear and the third drive gear and the third drive gear is axially positioned along the first shaft between the second drive gear and the first shift collar.

8. The axle assembly of claim 7 wherein the second shift collar is axially positioned between the first gear and the second gear and the second gear is axially positioned between the second shift collar and the third gear.

9. The axle assembly of claim 1 wherein a first shift fork couples the first shift collar to the sector cam and the sector cam defines a first groove that is completely disposed inside the sector cam and that receives a first guide feature that is operatively connected to the first shift fork.

10. The axle assembly of claim 9 wherein the first groove has a first groove side and a second groove side that is disposed opposite the first groove side, wherein the first guide feature engages the first groove side and the second groove side to constrain axial movement of the first shift fork.

11. The axle assembly of claim 9 wherein a second shift fork couples the second shift collar to the sector cam and the sector cam defines a second groove that is completely disposed inside the sector cam that receives a second guide feature that is operatively connected to the second shift fork.

12. The axle assembly of claim 11 wherein the second groove has a first groove side and a second groove side that is disposed opposite the first groove side, wherein the second guide feature engages the first groove side of the second groove and the second groove side of the second groove to constrain axial movement of the second shift fork.

13. The axle assembly of claim 11 wherein the first groove is positioned closer to the sector cam axis than the second groove is positioned to the sector cam axis and the second groove has a greater length than the first groove.

14. The axle assembly of claim 11 wherein the first shift fork and the second shift fork are slidable along a shift rail that is spaced apart from the sector cam, wherein the shift rail extends along a shift rail axis that extends substantially parallel to the first axis and the second axis.

15. The axle assembly of claim 14 wherein the shift rail axis is disposed closer to the first axis than the shift rail axis is disposed to the second axis.

16. The axle assembly of claim 14 further comprising a first shift bracket that has first and second flanges that define holes through which the shift rail extends, wherein the first shift fork is positioned between the first and second flanges and engages the first and second flanges such that the first shift fork and the first shift bracket are moveable together along the shift rail axis.

17. The axle assembly of claim 16 wherein the first guide feature extends from the first shift bracket and is received in the first groove.

18. The axle assembly of claim 14 further comprising a second shift bracket that has first and second flanges that define holes through which the shift rail extends, wherein the second shift fork is positioned between the first and second flanges and engages the first and second flanges such that the second shift fork and the second shift bracket are moveable together along the shift rail axis.

19. The axle assembly of claim 18 wherein the second guide feature extends from the second shift bracket and is received in the second groove.

20. An axle assembly comprising:
a first shaft that is rotatable about a first axis;
a second shaft that is rotatable about a second axis;
a first set of gears that is rotatable about the first axis; and
a second set of gears that is rotatable about the second axis, wherein each member of the second set of gears meshes with a different member of the first set of gears;
a first shift collar that is rotatable about the first axis with the first shaft and moveable along the first axis with respect to the first shaft to selectively connect a member of the first set of gears to the first shaft;
a second shift collar that is rotatable about the second axis with the second shaft and moveable along the second axis with respect to the second shaft to selectively connect a member of the second set of gears to the second shaft;
a shift rail that extends along a shift rail axis;
a sector cam that is rotatable about a sector cam axis and that is operatively connected to the first shift collar and to the second shift collar, wherein rotation of the sector cam about the sector cam axis controls movement of the first shift collar along the first axis and controls movement of the second shift collar along the second axis;
a first shift fork that couples the first shift collar to the sector cam, wherein the first shift fork is slidable along the shift rail; and
a first shift bracket that has first and second flanges that define holes through which the shift rail extends, wherein the first shift fork is positioned between the first and second flanges and engages the first and second flanges such that the first shift fork and the first shift bracket are moveable together along the shift rail axis.

* * * * *